No. 773,483. PATENTED OCT. 25, 1904.
M. W. DREW.
ENSILAGE CUTTER.
APPLICATION FILED NOV. 2, 1903.
NO MODEL.
FIG-1-
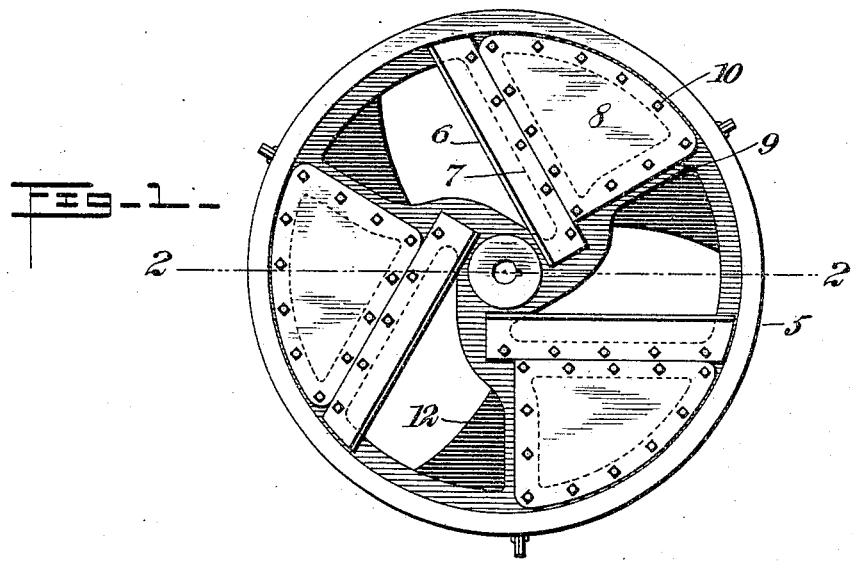
FIG-2-
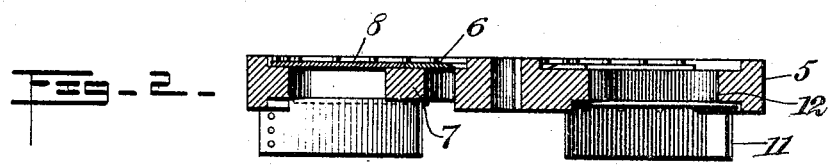
FIG-3-
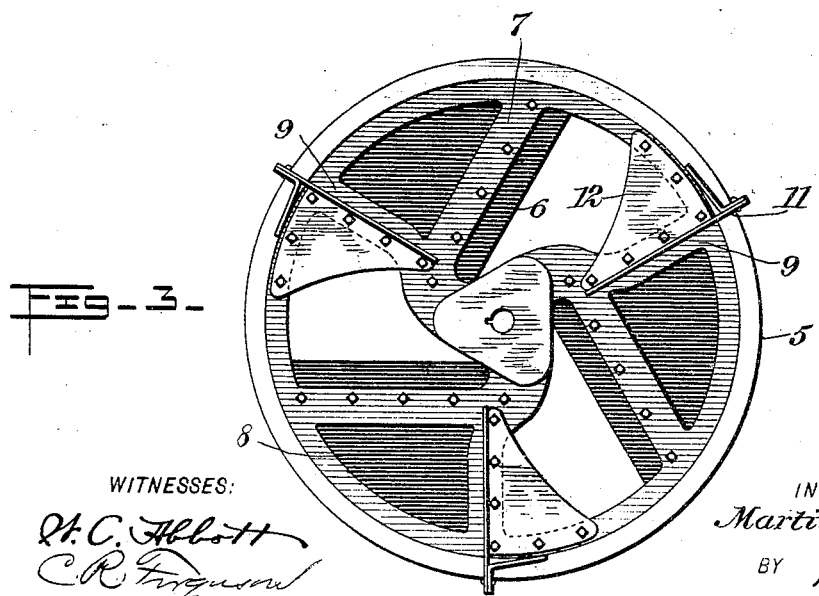
WITNESSES:
A. C. Abbott
C. R. Ferguson
INVENTOR
Martin W. Drew
BY
Munn
ATTORNEYS No. 773,483. Patented October 25, 1904.

UNITED STATES PATENT OFFICE.

MARTIN WILBER DREW, OF BLISS, NEW YORK.

ENSILAGE-CUTTER.

SPECIFICATION forming part of Letters Patent No. 773,483, dated October 25, 1904.

Application filed November 2, 1903. Serial No. 179,441. (No model.)

*To all whom it may concern:*

Be it known that I, MARTIN WILBER DREW, a citizen of the United States, and a resident of Bliss, in the county of Wyoming and State of New York, have invented a new and Improved Ensilage-Cutter, of which the following is a full, clear, and exact description.

This invention relates to improvements in ensilage or corn cutting wheels. In the usual cutting-wheels there are openings at the back of the knives, and while operating the husks or the like pass into these openings, wind around the wheel-spokes, and clog in the corners, thus throwing the wheel out of balance, and consequently requiring an increased power to run the machine.

It is an object of my invention to so construct a wheel that the above-mentioned difficulty will be obviated.

I will describe an ensilage-cutter embodying my invention and then point out the novel features in the appended claims.

Reference is to be had to the accompanying drawings, forming a part of this specification, in which similar characters of reference indicate corresponding parts in all the figures.

Figure 1 is a face view of an ensilage-cutter embodying my invention. Fig. 2 is a section on the line 2 2 of Fig. 1, and Fig. 3 is a face view the reverse of Fig. 1.

Referring to the drawings, 5 designates a wheel, and 6 the knives or cutting-blades, bolted to spokes 7 in the usual manner. Rearward of each knife is a stop-plate 8. These stop-plates are bolted to the spokes 7 and also to the spokes 9 immediately in the rear of the spokes 7, and bolts 10 secure the outer edges of the plates to the rim of the wheel. These plates are made quite thin, so as not to add materially to the weight of the wheel, and they entirely close the space between the spokes 7 and 9, thus preventing the passing through of material rearward of the knives. On the opposite side of the wheel and secured to the spokes 9 are the usual fans 11, and rearward of the fans are triangular plates 12, which form the front walls of the openings forward of the knives.

Having thus described my invention, I claim as new and desire to secure by Letters Patent—

1. In an ensilage-cutter, a wheel having a plurality of spokes, knives on alternate spokes, metal plates covering the space between the spokes to which the knives are attached and the spokes next in the rear of the knives, and triangular plates closing the forward sides of the openings in front of the knives.

2. In an ensilage-cutter, the combination of a spoked wheel and knives thereon, of metal plates bolted to the spokes to which the knives are attached and also bolted to the spokes immediately in the rear thereof, fans on the opposite side of the wheel, and triangular plates extended rearward from the fans and forming the front walls of the openings forward of the cutters.

In testimony whereof I have signed my name to this specification in the presence of two subscribing witnesses.

MARTIN WILBER DREW.

Witnesses:
LUTHER M. BLANCHARD,
WILLIS V. MORGAN.